A. G. J. RAPP.
BALL AND SOCKET BEARING.
APPLICATION FILED MAR. 26, 1909.
1,025,304.
Patented May 7, 1912.
2 SHEETS—SHEET 1.
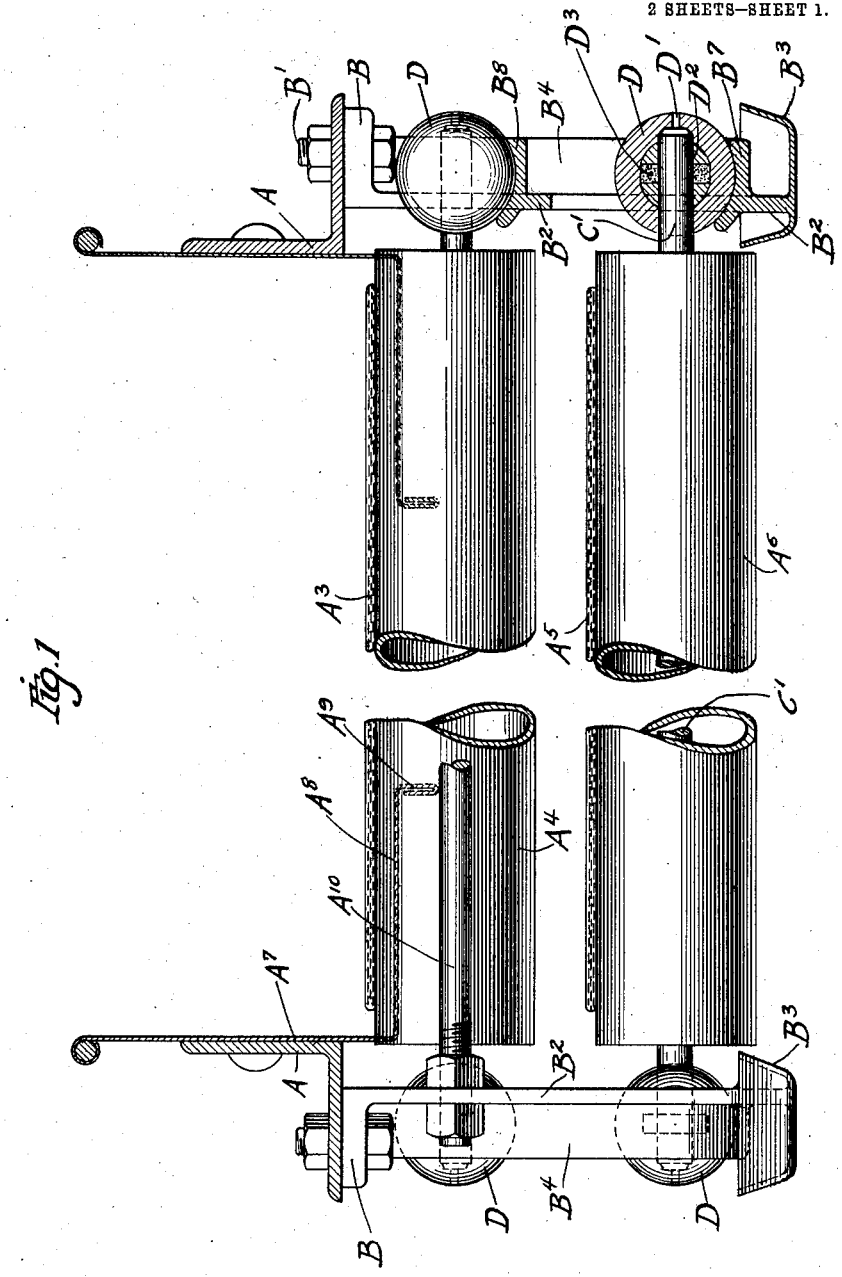

A. G. J. RAPP.
BALL AND SOCKET BEARING.
APPLICATION FILED MAR. 26, 1909.
1,025,304.
Patented May 7, 1912.
2 SHEETS—SHEET 2.
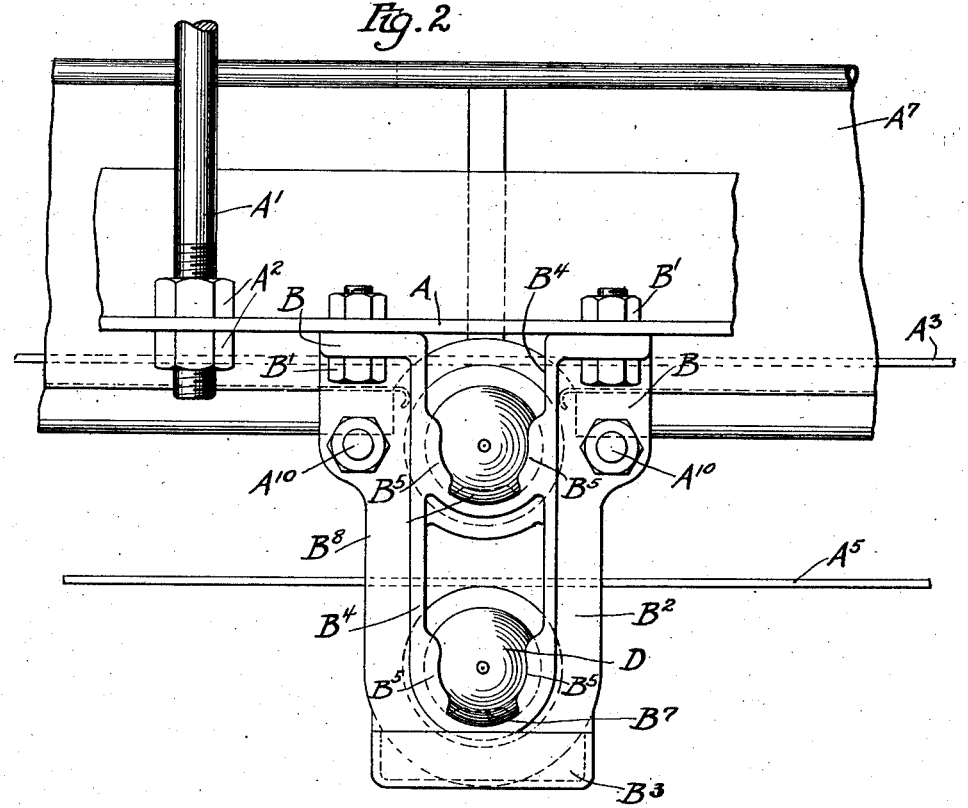
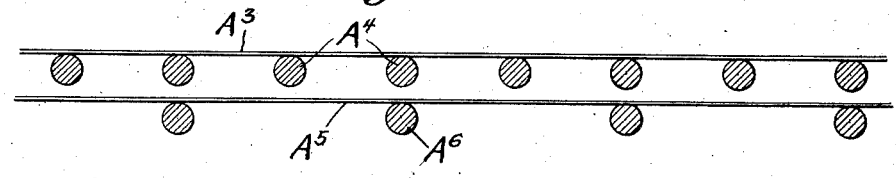

UNITED STATES PATENT OFFICE.

AXEL G. J. RAPP, OF CHICAGO, ILLINOIS, ASSIGNOR TO LINK-BELT COMPANY, OF CHICAGO, ILLINOIS, A CORPORATION OF ILLINOIS.

BALL-AND-SOCKET BEARING.

1,025,304.          Specification of Letters Patent.          Patented May 7, 1912.

Application filed March 26, 1909. Serial No. 485,890.

*To all whom it may concern:*

Be it known that I, AXEL G. J. RAPP, a citizen of the United States, residing at Chicago, in the county of Cook and State of Illinois, have invented a certain new and useful Improvement in Ball-and-Socket Bearings, of which the following is a specification.

My invention relates to a ball and socket bearing.

It is illustrated in the accompanying drawings as applied to a conveyer belt device.

Figure 1 is a cross section through a conveyer belt apparatus embodying my invention; Fig. 2 is a side elevation of a portion of such apparatus; Fig. 3 is a diagrammatic longitudinal section of certain details.

Like parts are indicated by the same letter in all the figures.

A, A are two angle bars preferably rigidly fixed in position, for example, by suspending rods $A^1$ with the adjusting nuts $A^2$ thereon.

$A^3$ is the upper run of a conveyer belt which travels over the relatively closely arranged idler rollers $A^4$, and $A^5$ is the lower run of such belt which is supported by any desired number of idler rollers $A^6$.

$A^7$ are angle plates secured to the angle bars and inwardly projecting as indicated at $A^8$ so as to present a flat bearing surface for the belt $A^3$ just below its lower surface and between the rollers $A^4$. The downwardly turned and preferably strengthened edge $A^9$ of this angle plate may rest upon the cross bars $A^{10}$.

At intervals along the angle bar and preferably secured to its outwardly turned horizontal flange are brackets B, B secured in position by the bolts and nuts $B^1$. These brackets are made single or double. Where they are used to support only one of the upper rollers $A^4$ they are single and where used to support both an upper roller $A^4$ and a lower roller $A^6$ they are made double. I shall describe the double bracket in one of its forms. Each of these brackets as shown, consists of a downwardly depending plate like body $B^2$, a lower oil pan $B^3$, a raised or outwardly projecting rim $B^4$, provided with lower inwardly projecting lugs $B^5$ $B^5$ and similar upper lugs, which extend inwardly from near the outer surface of the rim. Two sockets $B^7$ and $B^8$ extend across from wall to wall of the rim to receive each one of the balls. The plate $B^2$ inside the rim $B^4$, is cut away above the two sockets. The rolls $A^4$ and $A^6$, diagrammatically shown in Fig. 3, are preferably in the form shown in Fig. 1 where they consist of light cylindrical rolls mounted each on a shaft $C^1$. At each end of each shaft is a ball D preferably of Babbitt metal. At one end is a hole through which the end of the shaft $C^1$ is inserted and at the other, an opening $D^1$ through which oil is introduced. Each hole may be filled with a filling $D^2$ preferably of Babbitt metal and may also contain a ring of packing material $D^3$ to facilitate lubrication. Above the lugs $B^5$ $B^5$ the opening in the plate is so wide that the ball can be inserted from the outside between the walls of the rim $D^4$. Here it is slipped onto the end of the shaft and it is then dropped down into the socket.

The use and operation of my invention are as follows: Where long conveyer belts are used, they, of course tend to sag, to the injury of the belt or inconvenience of the operator and the reduction of efficiency in the device. For this reason it seems desirable to have a series of rolls placed comparatively short distances from each other and serving as idlers to support the belt. As above suggested, it may also be desirable to support the belt between the rolls on fixed flat surfaces. The lower run of the belt, of course, does not carry the weight of the load and need not have so many rollers. In practice I have one lower roller for every two or three upper rollers. The bracket which I have shown is a double bracket and is suitable for a pair of rolls, one for the upper run of the belt and the other for the lower run. Where a single roll only is supported, the bracket terminates as indicated in dotted lines in Fig. 2, the supports for the lower roll being omitted. When the brackets have been put in place it is easy to introduce the rolls between the brackets and then insert the balls by slipping one on each end of the roller shaft when the latter is elevated, and then dropping the roller shaft and two balls until both of the latter rest in their respective sockets. This produces in effect, a ball and socket joint at each end. Since the ball can be made of Babbitt metal it will rotate so far as required to do so, in its socket, and thus it can accommodate itself to any inequalities and irregularities in the several parts.

I claim:

1. In a bearing the combination of a shaft with two balls each perforated and adapted to receive slidably one end of the shaft, two socket-shaped bearings to receive the balls and supports whereby such bearings are mounted at a distance from each other approximately the distance of the length of the shaft, each of said supports provided with an opening above the socket through which the ball when raised can be moved away from the end of the shaft.

2. In a bearing, the combination of a shaft, balls loose and slidable on the ends thereof and bearings for the balls which prevent their motion on the shaft and supports for such bearings, and openings in the supports above the bearings to permit the motion of the balls along the line of the axis of the shaft.

3. In a bearing, the combination of a shaft, balls loose and slidable on the ends thereof, bearings for the balls which permit rotation but not displacement of the balls and openings above the bearings which permit displacement of the balls along the line of the axis of the shaft.

4. In a bearing, the combination with a shaft of a ball slidably mounted about either end of said shaft, a socket for each of said balls, a support for such socket and an opening in such support through which the ball may be vertically movable.

5. In a bearing, the combination of a shaft with balls slidably mounted on the ends thereof, of supports and bearings on said supports for each ball, the bearing opening above so that the ball may be lifted therefrom vertically, and the support opening laterally above the bearing so that the ball can be moved along the shaft when lifted from the bearing.

6. The combination of shafts arranged in two series, one above the other, with balls slidably mounted on the ends thereof, and supports rigidly held in fixed relation to each other, such supports provided with two series of bearings, each adapted to receive one ball and opening above to permit the ball to be lifted therefrom and lateral openings in the support above the bearings so that the balls when lifted from the bearings can be moved along the shafts.

7. In a bearing the combination with a shaft of a ball slidably mounted upon either end thereof, a socket substantially hemispherical conforming in shape and size with the ball, and a support for said socket there being a passageway through said support of substantially the same cross sectional area as the largest portion of the socket, and a passage at right angles to said passage and substantially the same size.

8. In a bearing the combination with a shaft of a ball slidably mounted upon either end thereof, a socket supporting said ball and a support for said socket, there being a passageway through said support and above said socket of substantially the same cross sectional area as the largest portion of the socket.

9. In a bearing the combination with a shaft of a ball slidably mounted upon either end thereof, a socket supporting said ball and a support for said socket, there being a passageway through said support and above said socket of substantially the same cross sectional area as the largest portion of the socket, and a passage at right angles to said former passage and substantially the same size.

AXEL G. J. RAPP.

Witnesses:
R. P. SHINERIN,
W. P. MACKAY.

Copies of this patent may be obtained for five cents each, by addressing the "Commissioner of Patents, Washington, D. C."